(12) United States Patent
Boucher et al.

(10) Patent No.: US 7,577,703 B2
(45) Date of Patent: Aug. 18, 2009

(54) STORE AND FORWARD ARCHITECTURE

(75) Inventors: Antoine Boucher, London (CA); Peter Coumans, London (CA); Peter Scheyen, London (CA); Brent Elphick, London (CA); Vasanthan Gunaratnam, Toronto (CA); Allan Lodberg, London (CA)

(73) Assignee: TVWorks, LLC, Philadelphia, PA (US)

( * ) Notice: Subject to any disclaimer, the term of this patent is extended or adjusted under 35 U.S.C. 154(b) by 115 days.

(21) Appl. No.: 11/318,892

(22) Filed: Dec. 27, 2005

(65) Prior Publication Data

US 2006/0101153 A1    May 11, 2006

Related U.S. Application Data

(63) Continuation of application No. 10/142,553, filed on May 9, 2002, now abandoned.

(51) Int. Cl.
G06F 15/16 (2006.01)
(52) U.S. Cl. ............................ 709/203; 725/68; 725/110
(58) Field of Classification Search ................. 709/203, 709/230; 725/68, 110
See application file for complete search history.

(56) References Cited

U.S. PATENT DOCUMENTS

| | | | | |
|---|---|---|---|---|
| 6,327,625 B1 * | 12/2001 | Wang et al. | ................. | 709/235 |
| 6,529,932 B1 * | 3/2003 | Dadiomov et al. | .......... | 718/101 |
| 6,622,925 B2 * | 9/2003 | Carner et al. | ............. | 236/46 R |
| 6,704,768 B1 * | 3/2004 | Zombek et al. | ............. | 709/201 |
| 2002/0019848 A1 * | 2/2002 | Sugawara et al. | ........... | 709/206 |
| 2002/0052968 A1 * | 5/2002 | Bonefas et al. | ............. | 709/231 |
| 2002/0147645 A1 * | 10/2002 | Alao et al. | ..................... | 705/14 |
| 2002/0152299 A1 * | 10/2002 | Traversat et al. | ............ | 709/223 |
| 2002/0169885 A1 * | 11/2002 | Alao et al. | .................. | 709/230 |
| 2003/0172181 A1 * | 9/2003 | Sharma | ..................... | 709/238 |

OTHER PUBLICATIONS

Qayyum H., Using IVDS and VBI for Interactive Television, Consumer Electronic, IEEE Transactions on vol. 42, issue 3, Aug. 1996, pp. 657-666.*
Sermersheim, J. Lightweight Directory Access Protocol (v3). Jan. 2001.*

* cited by examiner

Primary Examiner—Andrew Caldwell
Assistant Examiner—John M MacIlwinen
(74) Attorney, Agent, or Firm—Banner & Witcoff

(57) ABSTRACT

A store and forward (S&F) architecture is provided that supports multiple applications within an extensible network to direct information of various formats to any of multiple destinations. In the presently preferred embodiment of the invention, Java applications running on a client send non-priority data to any server on the application network or, alternatively, anywhere on a global telecommunications network such as the Internet, at some time in the future. In the preferred embodiment, S&F allows a client application to send usage statistics to a database on the application network. It also enables T-commerce purchases to be made by the user, where the purchase and other relevant information is sent to a destination web server as if the purchase had taken place on the web via a full web browser on an Internet-connected PC.

21 Claims, 11 Drawing Sheets

800

900

STORE AND FORWARD ARCHITECTURE

CROSS REFERENCE TO RELATED APPLICATIONS

This application is a continuation of U.S. patent application Ser. No. 10/142,553, filed May, 9, 2002 now abandoned.

BACKGROUND OF THE INVENTION

1. Technical Field

The invention generally relates to communications systems. More particularly, the invention generally relates to store and forward architecture.

2. Description of the Prior Art

The term "store and forward architecture" pertains to communications systems in which messages are received at intermediate routing points and recorded (i.e., stored) and then transmitted (i.e., forwarded) to the next routing point or to the ultimate recipient. Such systems are commonly used in the cable and satellite television industry. For example, DirecTV operates a satellite television system that offers such services as Pay-Per-View. In Pay-Per-View mode, a subscriber to DirecTV selects a program to be purchased and viewed. The subscriber typically has a set top box (e.g., a satellite receiver in the case of DirecTV) that contains information about the subscriber's privileges and, if the subscriber is authorized to purchase Pay-Per-View broadcasts, the set top box decodes the program selected by the subscriber for viewing when it is broadcast (e.g., via the DirecTV satellite). The set top box captures information with regard to the purchase (i.e., it stores purchase information for billing purposes). At an appropriate time, (e.g., during a regularly scheduled upstream communication from the set top box to DirecTV, such as a telephone call) the set top box sends this purchase information to the Pay-Per-View service (i.e., it forwards this stored information to DirecTV to allow the subscriber's account to be billed for their purchase of the program which they selected and viewed).

While such systems provide an effective approach to a dedicated application, (e.g., Pay-Per-View services) they are not useful or readily configurable for execution of multiple applications (e.g., Pay-Per-View and messaging and shopping). Further, such known systems operate within the confines of a well-defined network architecture (e.g. the Pay-Per-View server and associated network elements). Thus, they are not easily reconfigured to provide disparate services over an extended or extensible network. They cannot discern whether one destination within the network is more appropriate than another, because they are set to communicate with a specified destination for a dedicated purpose. They are, therefore, not agile at routing information among multiple destinations. Finally, such known systems operate within specified parameters that treat all communications in a similar fashion because all communications relate to the same thing, (e.g., Pay-Per-View). Thus, there is no notion of scheduling events, such as upward communication, based upon the nature of information to be communicated, nor are different information formats or protocols handled well within such known systems.

It would be advantageous to provide a store and forward system that supported multiple applications within an extensible network to direct information of various formats to any of multiple destinations.

SUMMARY OF THE INVENTION

Exemplary embodiments include methods and systems for a store and forward (S&F) architecture that supports multiple applications within an extensible network to direct information of various formats to any of multiple destinations. In one embodiment of the invention, Java applications running on a client send non-priority data to any server on the application network or, alternatively, anywhere on a global telecommunications network (e.g., the Internet), at some time in the future.

One embodiment is a method for an S&F system that allows a client application to send usage statistics to a database on the application network. It also enables television-based commerce (T-commerce) purchases of products via interaction with the T.V. to be made by the user, where the purchase and other relevant information is sent to a destination web server as if the purchase had taken place on the web via a full web browser on an Internet-connected personal computer (PC).

One exemplary embodiment is an S&F system, including: client-side code in a micro Java virtual machine, a Java byte code execution engine (i.e., a user space virtual machine, (UVM)), and a server-side proxy server process, communications networks, and a server-side Application server process. One communications network transports information from the client to the S&F proxy (e.g., a real-time two-way radio frequency (RF) network). Another communications network transports information from the S&F proxy to the Application Server process (e.g., an Internet protocol (IP) network).

DETAILED DESCRIPTION OF THE INVENTION

Exemplary embodiments of the invention provide a store and forward (S&F) system and methods to support multiple applications within an extensible network to direct information of various formats to any of multiple destinations. In one embodiment, Java applications running on a client send non-priority data to any server on the application network or, alternatively, anywhere on a global telecommunications network such as the Internet, at some time in the future. The S&F system has many applications, including collecting statistics and T-commerce.

In one embodiment, the S&F system allows a client application to send usage statistics to a database on the application network. It also enables T-commerce purchases to be made by the user, where the purchase and other relevant information is sent to a destination web server as if the purchase had taken place on the web via a full web browser on an Internet-connected PC. This embodiment includes two distinct parts: client-side code in the UVM; and a server-side proxy server process.

Architectural Overview

Figure 1A:
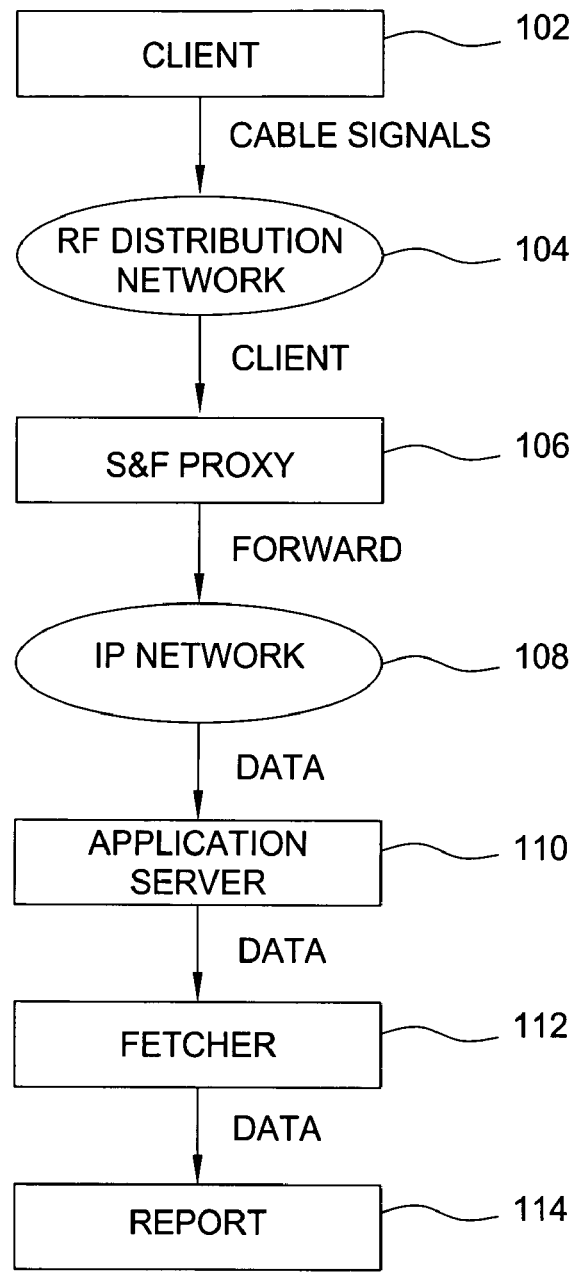
FIG. 1A is a block schematic diagram that shows an exemplary embodiment of a store and forward logical architecture and data flow, according to the invention.

FIG. 1A is a block schematic diagram showing an exemplary embodiment 100 of a store and forward logical architecture and data flow, according to the invention. In this exemplary embodiment 100, a client 102 (e.g., a set top box (STB)) sends cable signals to an RF distribution network 104. The RF distribution network 104 sends client messages, (e.g., user datagram protocol (UDP) messages) to an S&F proxy 106 at a headend. The S&F proxy 106 sends forwarded messages (e.g., UDP, TCP/IP or HTTP messages) to an IP network 108. The IP network 108 sends data to an application server 110. The application server 110 sends data to a fetcher 112 to further process messages. The fetcher 112 uses the data to generate a report 114. While only one client 102 and application server 110 are shown in FIG. 1A, this exemplary embodiment may include any number of clients 102, and/or application servers 110.

Figure 1B:
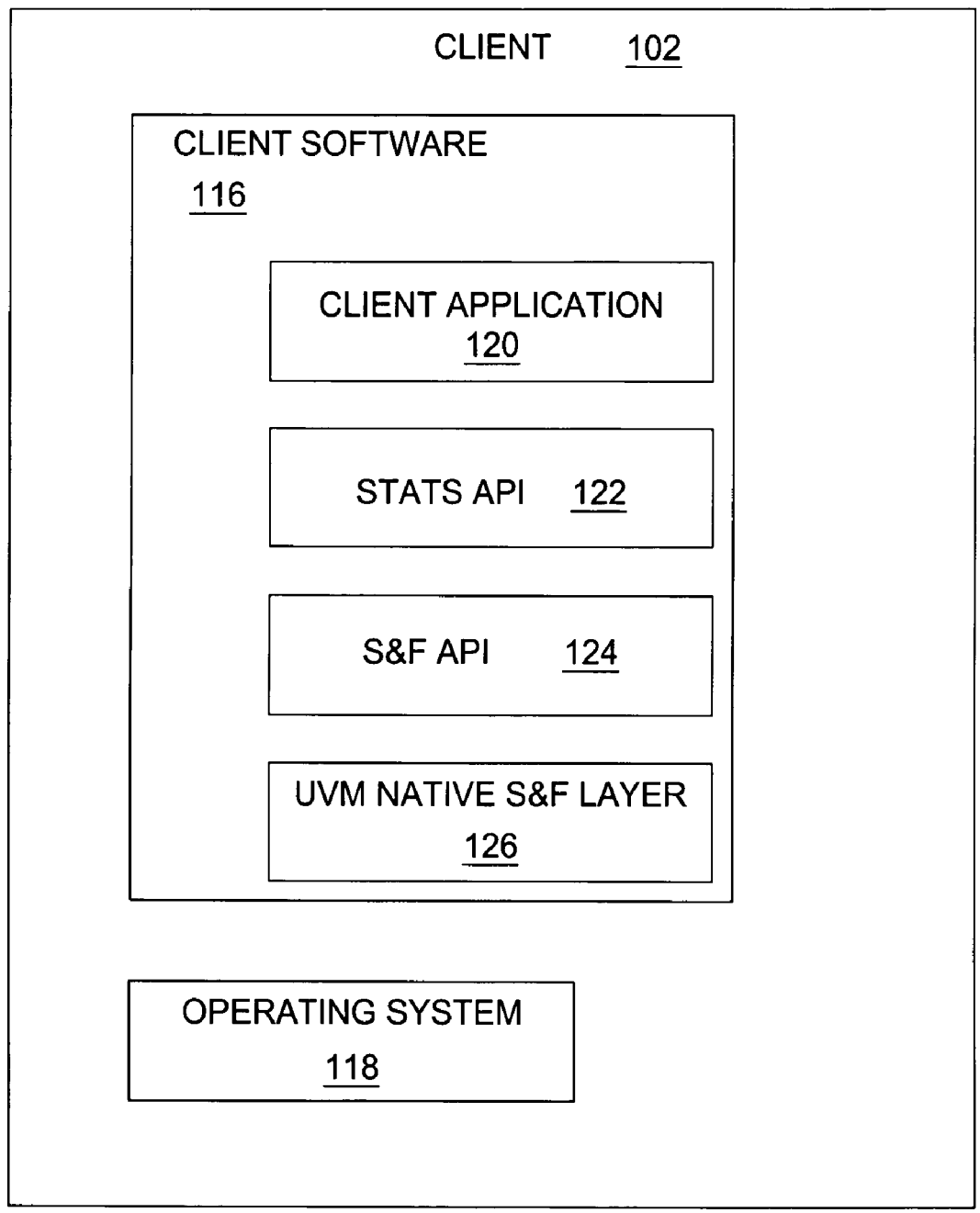
FIG. 1B is a block schematic diagram showing the client of FIG. 1A in more detail.

FIG. 1B is a block schematic diagram showing the client 102 of FIG. 1A in more detail. The client 102 includes client software 116 and an operating system 118. The client software 116 includes a client application 120, a statistics (stats) application program interface (API) 122, an S&F API 124, and a UVM native S&F layer 126.

In this exemplary embodiment, the client application 120 is a Java applet running on the client 102. The client application 120 uses the services provided by the stats API 122 and the S&F API 124 to send statistics or application-specific data to the application server 110.

In this exemplary embodiment, the stats API 122 is middleware that resides on the client 102. It facilitates the gathering of user events from client applications 120 on different clients 102. For example, when a user starts an application from the main navigation screen (NavShell), the stats API 122 records the time and the application that was started. The stats API 122 then uses the S&F API 124 to send the statistics data to the S&F proxy 106 and ultimately to an application server 110 to collect usage statistics.

In this exemplary embodiment, the stats API 122 provides to the S&F API 124 the IP address and port number of the application server 110 to which the statistics data is sent to the S&F API 124. In one embodiment, the client software 116 can be configured with default values for the application server 110.

In one embodiment, each client 102 can be configured to send statistics without identifying the sender. This allows statistics to be collected anonymously, which protects individual subscribers' privacy. In addition, the client 102 can be configured with the amount of memory to use for storing statistics. Configuration can also specify that statistics are sent after a fixed period of time or after a certain amount of data has been collected.

In one embodiment, the S&F API 124 is used by the stats API 122, but the S&F API 124 can also be used by the client application 120 directly. The S&F API 124 allows the user to specify several attributes that affect how, when and where the data is sent. The user of the S&F API 124 is required to provide the IP address and port number of the application server 110 that receives the data. The user also provides the transmission protocol that the S&F proxy 106 uses to send the data to the application server 110. Internet protocols are supported, e.g., UDP, transmission control protocol (TCP) and hypertext transfer protocol (HTTP). When the S&F API 124 receives a request to send, the data and all optional and required parameters are passed to the UVM native S&F layer 126.

In one embodiment, the S&F API 124 allows the user to specify when the initial attempt to send the data occurs, how long this transaction has to complete and how many times to retry sending the data to the S&F proxy 106.

In one embodiment, when the UVM native S&F layer 126 receives data to send, it formats a message that contains the address of the application server 110 as well as the data. For more information about the structure of the message, see FIGS. 5 and 6.

In one embodiment, the UVM native S&F layer 126 stores data in non-volatile read-only memory (NVRAM) to ensure that the data will be saved if the power is lost. In one embodiment, the S&F proxy 106 can be configured to not send S&F data during certain times of the day, called blackout periods. These blackout periods are used when the client 102 is being polled to retrieve PPV purchase information. Any additional traffic during these times would affect the reliability of retrieving this information. Alternatively, data can be sent from the client 102 to the S&F proxy 106 and stored in a database.

One exemplary embodiment is a scheduling algorithm that includes transaction lifetime, initial send delay, and the blackout schedule. In order to avoid having all the clients 102 on a network attempt to send at the same time (which would result in severe data loss), a random element is also added to the scheduling algorithm.

In one embodiment, each client 102 is also configured with the amount of memory to use for S&F data, the maximum number of messages to store before sending, and the IP address and port of the S&F proxy 106 to send to.

The operating system 118 provides access for sending and receiving data over the RF Distribution Network 104.

In one embodiment, the RF Distribution Network 104 is a two-way real-time RF network. Data delivery over this network is unreliable. One exemplary embodiment of the S&F system implements additional levels of reliability. The S&F API 124 allows a caller to determine which level of reliability is required.

In one embodiment, the S&F proxy 106 is a server-side process that facilitates upstream communication for the client 102 via an NC1500, which is an upstream communications router (manufactured by Motorola). It is specifically used for delivering messages sent by clients 102 (via the RF distribution network 104) to a headend communications network (not shown). When user event data is received by the S&F proxy 106, the S&F proxy 106 tries to deliver the data to the application server 110 specified in the data, via UDP, TCP or HTTP as specified in the data. The S&F proxy 106 can send data to any of a number of application servers that are reachable via the IP network 108. The S&F proxy 106 sends data to the application server 110 across the IP network 108. The S&F proxy 106 and the application server 110 can communicate via any standard Internet Protocols, such as UDP, TCP or HTTP.

In one embodiment, the application server 110 is an entity connected to the IP network 108 that can receive data from the client application 120 via at least one of UDP, TCP and HTTP. The application server 110 is responsible for parsing and processing the data sent by the client application 120. The S&F proxy 106 can be used to communicate to any application server 110 via the UDP, TCP/IP, or HTTP protocols.

In one embodiment, the S&F API 124 is used by the client application 120 to send raw data to a third party server using UDP, TCP, or HTTP. In one embodiment, the S&F API 124 interfaces with the UVM native S&F layer 126, which is part of the UVM. In one embodiment, the UVM native S&F layer 126 stores data either in dynamic RAM or in non-volatile memory, until it is received by the S&F proxy 106. One embodiment is a scheduling algorithm that takes into account blackout periods to determine when to send (i.e., forward) data to the S&F proxy 106. The scheduling algorithm attempts to minimize data loss in the upstream direction by sharing the upstream communications resource across all clients 102 so as not to overload the upstream channel. One embodiment includes formatting data according to an S&F protocol.

Store And Forward Client-Proxy Protocol

One exemplary embodiment is a store and forward client-proxy protocol that allows for varying levels of reliability, which is achieved through the use of messages passed from the client 102 to the S&F proxy 106 and from the S&F proxy 106 to the client 102. The client 102 can specify the level of messaging required by setting flags in each request message to the S&F proxy 106.

In one embodiment, there are three flags that can be set: ACK, RESULT, and DONE. They can be set individually or in combination, but some combinations are invalid. Other flags may be provided as well in alternative embodiments of the invention. The first flag (ACK) tells the S&F proxy 106 whether or not to send the client 102 an acknowledgement when it has received the client's request. The purpose of this flag is to let the client 102 know that it is safe to purge the request data from NVRAM. The second flag (RESULT) tells the S&F proxy 106 whether or not the client 102 wants to be informed of the result of the request. Low-priority requests may not require a result to be sent back to the client. The third flag (DONE) tells the S&F proxy 106 whether or not to hold the result of the request until the client 102 sends the S&F proxy 106 a message acknowledging the receipt of the request result. This is important if the client 102 must know the result of the request. Without this flag, the S&F proxy 106 sends the result only once before purging the request. If that message gets lost, the client 102 is not able to determine the result. With this flag set, the S&F proxy 106 holds onto the request and the result until the client 102 indicates that it has successfully received the result.

Delayed Ack

In this exemplary embodiment, if the ACK flag is set or the RESULT flag is set, then the client 102 implements a delayed ACK scheme. This means that when the S&F proxy 106 receives a request, the S&F proxy 106 does not send the acknowledgement message right away if the ACK flag is set, but tries to complete the transaction first. If the request completes within a few seconds, e.g., ten seconds, the request result is sent instead of the acknowledgement. If the request cannot be completed in that time, the request is written to the database and, then, the acknowledgement is sent to the client 102. When the request result is determined later, the result is sent if the RESULT flag is set. If the ACK flag is set and the S&F proxy 106 receives a duplicate request, it sends back an ACK immediately. A likely reason for the S&F proxy 106 to receive a duplicate is because the client 102 never received the first ACK, probably due to a lost message.

One exemplary embodiment is a method of operating flags. This method describes the effects of the various combinations of flags.

In this exemplary embodiment, for the combination {ACK-0, RESULT-0, DONE-0}, the client 102 sends the request, but the S&F proxy 106 does not store this in a database. The S&F proxy 106 does not send any message to the client 102 about this request. The S&F proxy 106 purges all information about this request as soon as it completes or times out.

In this exemplary embodiment, for the combination {ACK-1, RESULT-0, DONE-0}, when the S&F proxy 106 receives this message, it sends either an ACK or the result, but not both. See the discussion of DELAYED ACK for more details. The S&F proxy 106 writes this request to the database, if the request cannot be completed immediately. The S&F proxy 106 purges this request as soon as the result is known or the request timeout occurs.

In this exemplary embodiment, for the combination {ACK-0, RESULT-1, DONE-0}, when the S&F proxy 106 receives this message, the S&F proxy 106 attempts to carry out the request. See the discussion of DELAYED ACK for more details. The S&F proxy 106 writes this request to the database, if the request cannot be completed immediately. When the result of the request is known, the S&F proxy 106 sends the result once to the client 102 and immediately purges this request.

In this exemplary embodiment, for the combination {ACK-0, RESULT-0, DONE-1}, which is an invalid combination, if the S&F proxy 106 receives a request with this combination set, it turns off the DONE flag and treats it as if the flags were (0,0,0).

In this exemplary embodiment, for the combination {ACK-1, RESULT-1, DONE-0}, when the S&F proxy 106 receives this message, the S&F proxy 106 attempts to carry out the request. See the discussion of DELAYED ACK for more details. The S&F proxy 106 writes this request to the database, if the request cannot be completed immediately. When the result of the request is known, the S&F proxy 106 sends the result once to the client 102 and immediately purges this request.

In this exemplary embodiment, for the combination {ACK-1, RESULT-0, DONE-1}, which is an invalid combination, if the S&F proxy 106 receives a request with this combination set, it turns off the DONE flag and treats it as if the flags were (1,0,0).

In this exemplary embodiment, for the combination {ACK-0, RESULT-1, DONE-1}, the S&F proxy 106 processes the request immediately, but only writes it to the database, if the request cannot be completed in a certain period of time. No ACK is sent to the client 102, once the request has been written to the database. Once the result of the request is known, the result is sent back to the client 102. The S&F proxy 106 does not purge this result until it receives the DONE message from the client 102 or until the request expiry time elapses.

In this exemplary embodiment, for the combination {ACK-1, RESULT-1, DONE-1}, the S&F proxy 106 processes the request immediately, but only writes it to the database, if the request cannot be completed in a certain period of time and an ACK is sent to the client 102. Once the result of the request is known, the result is sent back to the client 102. If the result is known before the ACK has been sent, the request is not written to the database and the result is sent to the client 102 instead of the ACK. See the DELAYED ACK discussion for more details. The S&F proxy 106 does not purge this result until it receives the DONE message from the client 102 or until the request expiry time elapses.

Communication Session (Result)

Figure 2:
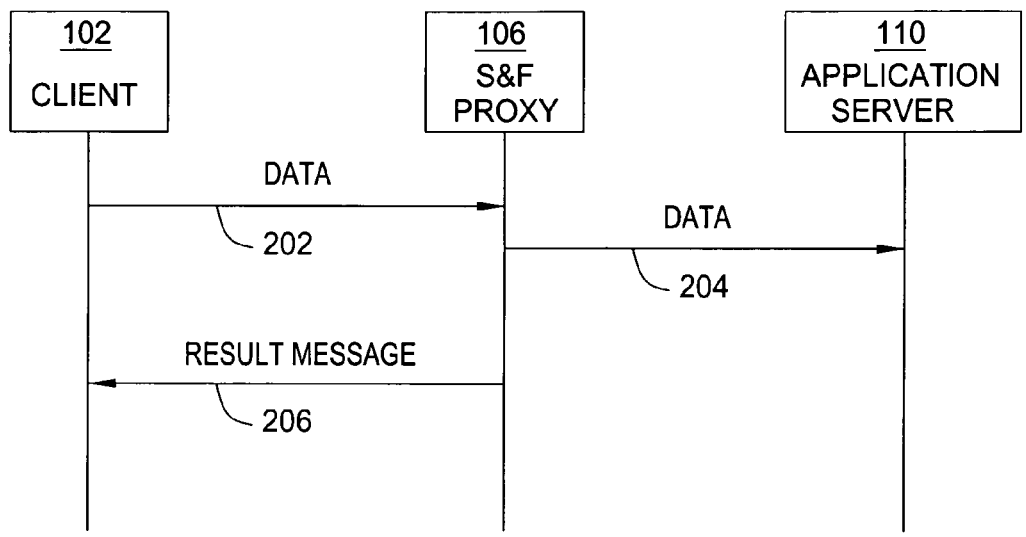
FIG. 2 is a flow diagram showing an exemplary embodiment of a method of providing communication sessions between the client and the application server via the S&F proxy.

FIG. 2 shows an exemplary embodiment 200 of a method of providing communication sessions between the client 102 and the application server 110 via the S&F proxy 106. The specifics of these communication sessions are configurable by using the three bit flags entry in a data_send packet. Setting the flags bits to 010 (-, RESULT, -) produces the communication session shown in FIG. 2. At 202, the client 102 sends data to the S&F proxy 106. At 204, the S&F proxy 106 transfers the data from to the application server 110 from memory. At 206, the S&F proxy 106 sends a RESULT message to the client 102 to inform it of the status of the data send to the application server 110 so that it may purge the majority of the transaction from memory. In the event that the initial data does not reach the S&F proxy 106 or the S&F proxy 106 goes down between the time the data is received and is sent to the application server 110, a RESULT message is not sent and the client 102 assumes that the data did not reach the S&F proxy 106, thereby causing a retransmit from the client.

Figure 3A:
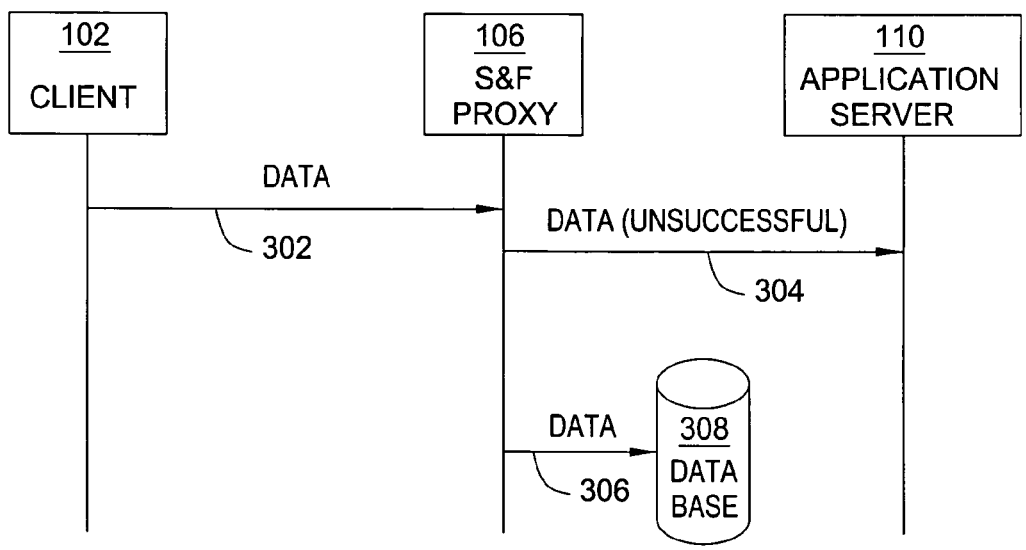
FIGS. 3A-3D are flow diagrams showing an exemplary embodiment of a method of providing communication sessions.
Figure 3B:
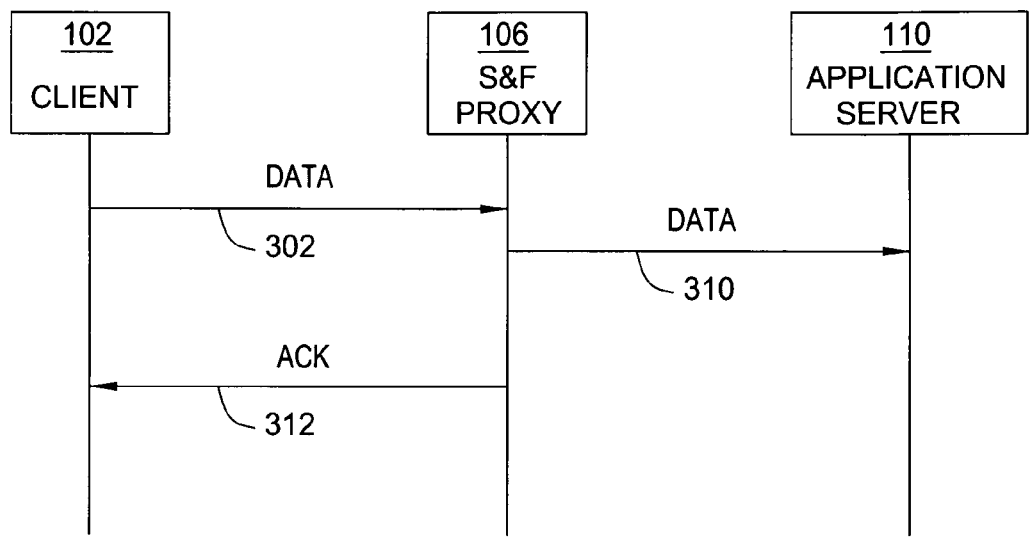
Figure 3C:
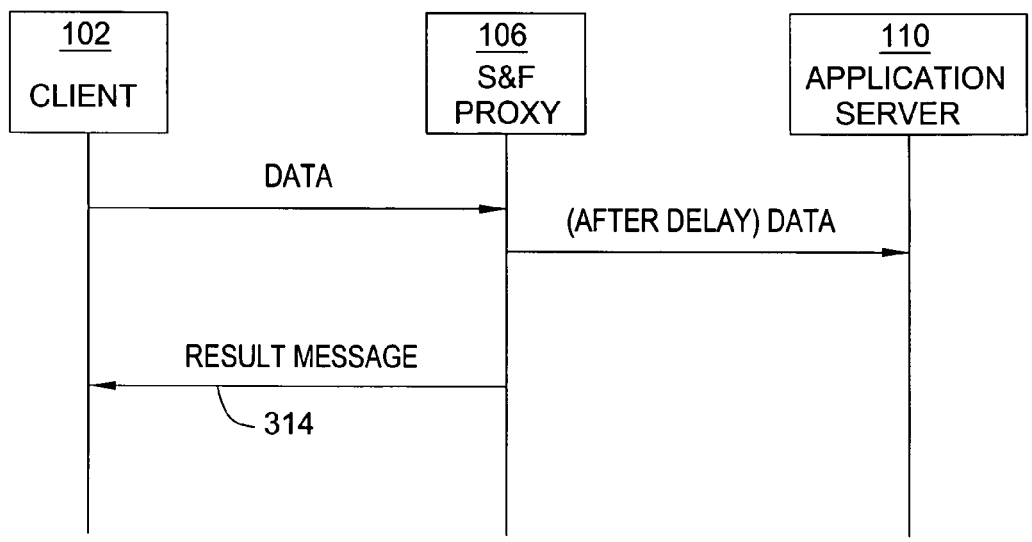
Figure 3D:
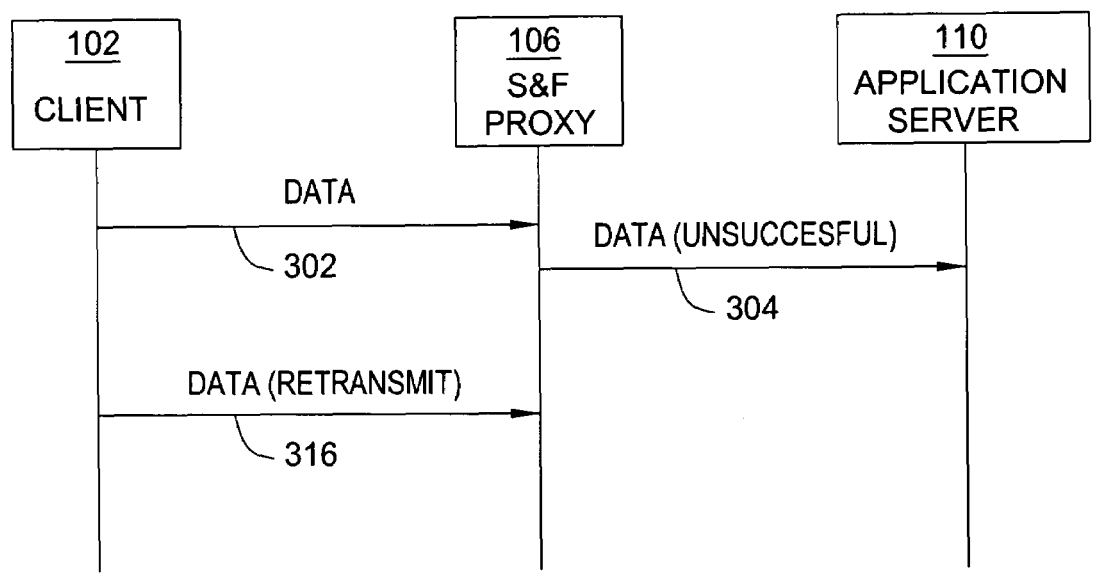

FIGS. 3A-3C show an exemplary embodiment 300 of a method of providing communication sessions. FIG. 3A shows a scenario in which the application server 110 cannot be contacted within a prescribed (short) period of time. At 302, the client 102 sends data to the S&F proxy 106. At 304, the S&F proxy 106 then attempts to transfer the data to the application server 110 from memory. After a predetermined number of seconds the S&F proxy 106 assumes the application server 110 is down and, at 306, writes the transaction to the database 308. FIG. 3B shows a scenario in which the transfer is successful. The S&F proxy 106 sends an ACK message, when the S&F proxy 106 has been able to deliver the message to the specified final destination. FIG. 3C shows a scenario in which the S&F proxy 106 sends the data to the application server 110 at a later date. At 314, the S&F proxy 106 then sends a RESULT message to the client 102 so that it may purge the majority of the transaction from NVRAM. FIG. 3D shows a scenario in which the initial data does not reach the S&F proxy 106 or the S&F proxy 106 goes down between the time the data is received and it is sent to the application server 110, an ACK message is not sent and the client 102 assumes that the data did not reach the S&F proxy 106 causing a retransmit at 316.

Store And Forward Summary

Table C shows pseudo code for an exemplary embodiment of a method for providing a store and forward architecture in the client 102 that includes Java features, such as asynchronous application layer APIs, e.g., http APIs, and a Java API.

TABLE C

```
public class StoreAndForward
{
    /* * Used to store and forward data to the 3rd party application
     * server identified by <addr:port> using the specified protocol.
     * The same instance can be used to forward multiple sets
     * of data.
     */
    public StoreAndForward (InetAddress addr, int port, int protocol);
    /* Returns the IP address of the 3rd party application server. */
    public InetAddress getInetAddress ( );
    /* Returns the port of the 3rd party application server.*/
    public int getPort ( );
    /* Returns the protocol used to communicate with the app. server */
    public int getProtocol ( );
    /* Returns the current timeout value. */
    public int getTimeout ( );
    /* Returns the current maximum retry count.*/
    public int getMaxRetryCount ( );
    /* isTransaction*/
    public boolean isTransaction ( );
    /* Sets the number of retries for forwarding data.
     * After this limit is reached, no more retries are attempted
     * but the transaction state is stored until the expiry time.
     */
    public void setMaxRetryCount (int count);
    /* Sets the time in seconds after which transaction is abandoned.*/
    public void setTimeout (int timeout);
    /* setTransaction */
    public void setTransaction(boolean isTransaction);
    /* Sets the minimum time (in seconds) after which the first
     * attempt to send data is to be made.
     */
    public void setInitialSendTime (int time);
    /* Add listener to get status on all unfinished transactions */
    public void addNotify (SFNotifyListener nl);
    /* Removes a listener from the list of listeners. */
    public void removeNotify (SFNotifyListener nl);
    /* Submits data to be forwarded to the 3rd party server. */
    /* The transaction-id is returned. */
    public native int forwardData (byte [ ] data, int offset, it len);
    /* Cancels the transaction. */
    public native int cancelTransaction(int transactionID);
}
```

End-To-End Description

One exemplary embodiment is a method for conducting a store and forward transaction that has the following steps.

1. The Java applet creates an instance of a StoreAndForward object.

2. The applet fills in the required data and invokes the send ( ) method.

3. The code in the JVM optionally stores the request in NVRAM to guard against power outages.

4. At some point in the future, the JVM sends a copy of this request to the proxy server, keeping the original in NVRAM (the flags field directs what the S&F proxy 106 does).

5. The S&F proxy 106 receives the message from the client 102 and tries to forward the message before it stores a copy in a database 308 to prevent data loss.

6. If the ACK flag is set, the S&F proxy 106 sends an acknowledgement back to the client 102, which tells the client 102 that the S&F proxy 106 has successfully received the data, and the S&F proxy 106 attempts to deliver it to the application server 110 specified in the data.

7. The client 102 receives this acknowledgement and can then remove the payload part of this transaction from NVRAM because the S&F proxy 106 has it. It must keep some information about the transaction in NVRAM until it has completed.

8. The S&F proxy 106 attempts to contact the application server 110 at the IP address and port given in the request data via the protocol that the client 102 requested. In one embodiment, UDP, TCP, and HTTP POST requests are supported.

9. The S&F proxy 106 continues to try to send the data until the retry count or time limit to send the data has expired.

10. The S&F proxy 106 creates a transaction status message with the final result. If the original request was stored in the database 308, the final result is modified in the database record. If the request was not stored, it is not added in this phase. The S&F proxy 106 only sends the final result if the RESULTS flag is set. If the DONE flag is set, the S&F proxy 106 resends the result message until the time limit is reached, or it gets a DONE message.

11. When the client 102 receives the transaction result, it can notify the original applet if it is still running.

12. The client 102 purges the transaction:
   a) immediately after sending, if both the ACK and RESULTS are not flags are set (i.e., they are clear);
   b) after receiving an ACK, or after the transaction expires, if the RESULTS flag is set.

13. When the S&F proxy 106 receives this DONE status message from the client 102, the S&F proxy 106 purges all records of this transaction from the database 308.

Protocol Summary

One exemplary embodiment is an S&F protocol that can be configured on each request to control the level of reliability to make the protocol flexible to handle different client requirements. The S&F protocol does this by setting up to three bit flags in the store and forward protocol header. Each of these flags adds more reliability. The S&F protocol does this by indicating the messages that are exchanged between the client 102 and the S&F proxy 106.

In this exemplary embodiment, the three possible flags are: SEND_DATA_ACK, SEND_RESULT, and SEND_DONE. The SEND_DATA_ACK flag indicates that the client 102 wants the S&F proxy 106 to send an acknowledgement that the S&F proxy 106 received the client's request successfully. The client 102 keeps retransmitting the request until this acknowledgement is received. The SEND_RESULT flag indicates that the client 102 wants to have the result of the transaction sent back to it when the transaction has either completed successfully, failed, or that the lifetime has expired before the transaction could be completed. This flag can be used with the SEND_DATA_ACK flag or can be used on its own. The SEND_DONE flag indicates that the client 102 sends a TRANSACTION_DONE message to the proxy after it receives the transaction result. This flag is only valid if the SEND_RESULT flag is also on. Setting this flag allows the S&F proxy 106 to know when the client 102 is done with the transaction so that the S&F proxy 106 can purge all data associated with this transaction.

Figure 4A:
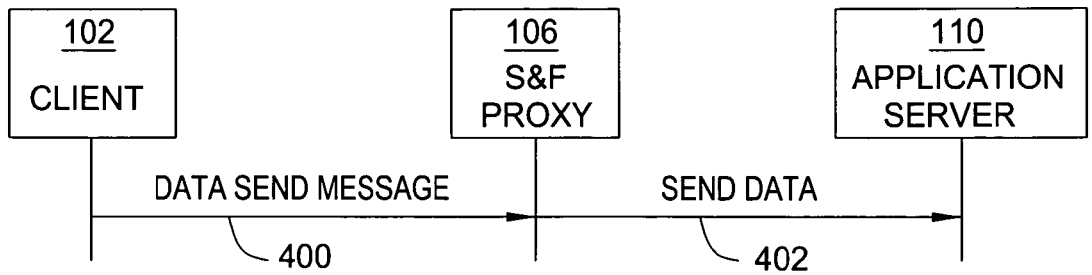
FIG. 4A is a flow diagram showing the messages that are exchanged when no flags are set, in an exemplary embodiment.

FIG. 4A shows the messages that are exchanged when no flags are set, in this exemplary embodiment. The client 102 sends the data send message at 400 to the S&F proxy 106, which sends the data to the application server 110 at 402.

Figure 4B:
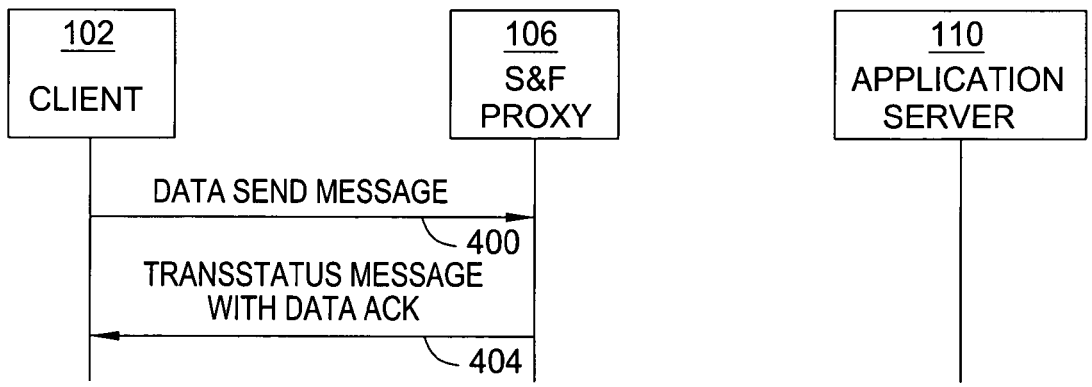
FIG. 4B is a flow diagram showing the messages that are exchanged when the SEND_DATA_ACK flag is set, in an exemplary embodiment.

FIG. 4B shows the messages that are exchanged when the SEND_DATA_ACK flag is set, in this exemplary embodiment. The client 102 sends the data send message at 400 to the S&F proxy 106. The S&F proxy 106 sends a transaction status message with data acknowledgement to the client 102 at 404.

Figure 4C:
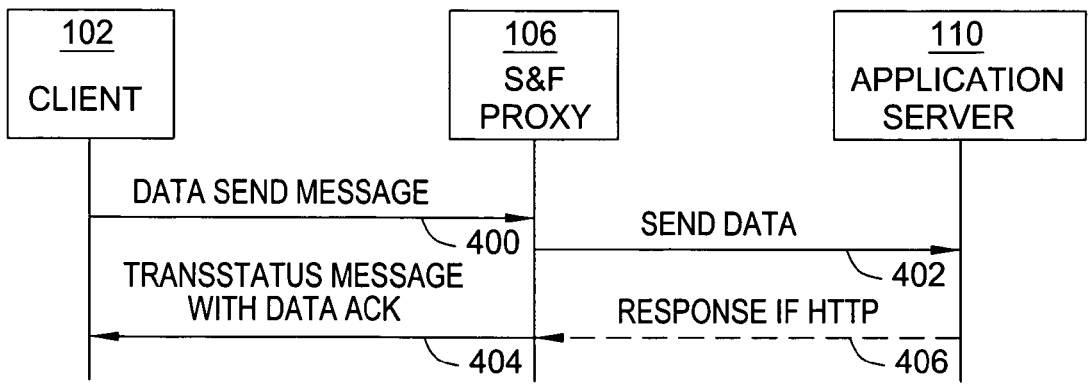
FIG. 4C is a flow diagram showing the messages that are exchanged when the SEND_RESULT flag is set, in an exemplary embodiment.

FIG. 4C shows the messages that are exchanged when the SEND_RESULT flag is set, in this exemplary embodiment. The client 102 sends the data send message at 400 to the S&F proxy 106. The S&F proxy 106 sends the data to the application serer 110 at 402. The S&F proxy 106 sends a transaction status message with data acknowledgement to the client 102 at 404. The application server 110 sends a response to the S&F proxy 106, if HTTP at 406.

Figure 4D:
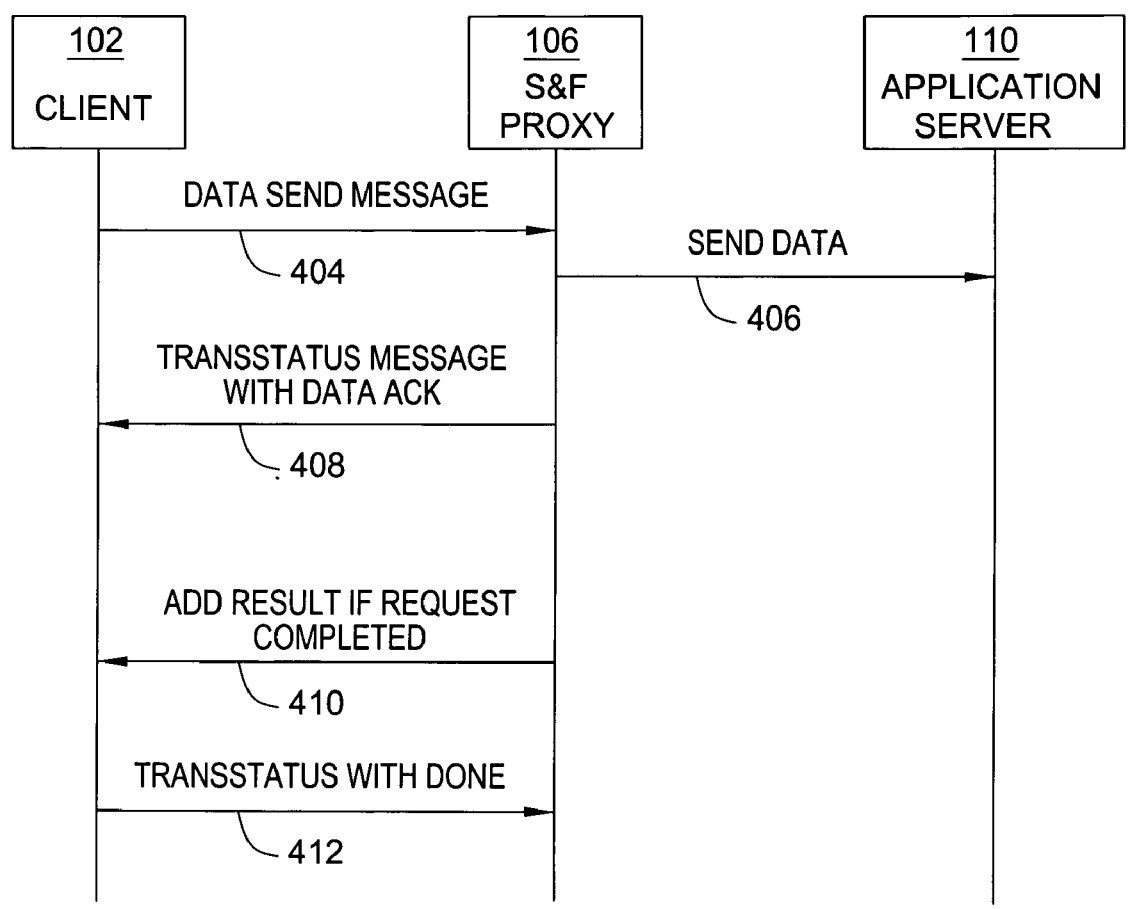
FIG. 4D is a flow diagram showing the messages that are exchanged with the DATA_ACK, SEND_RESULT, and SEND_DONE flags are set, in an exemplary embodiment.
Figure 4E:
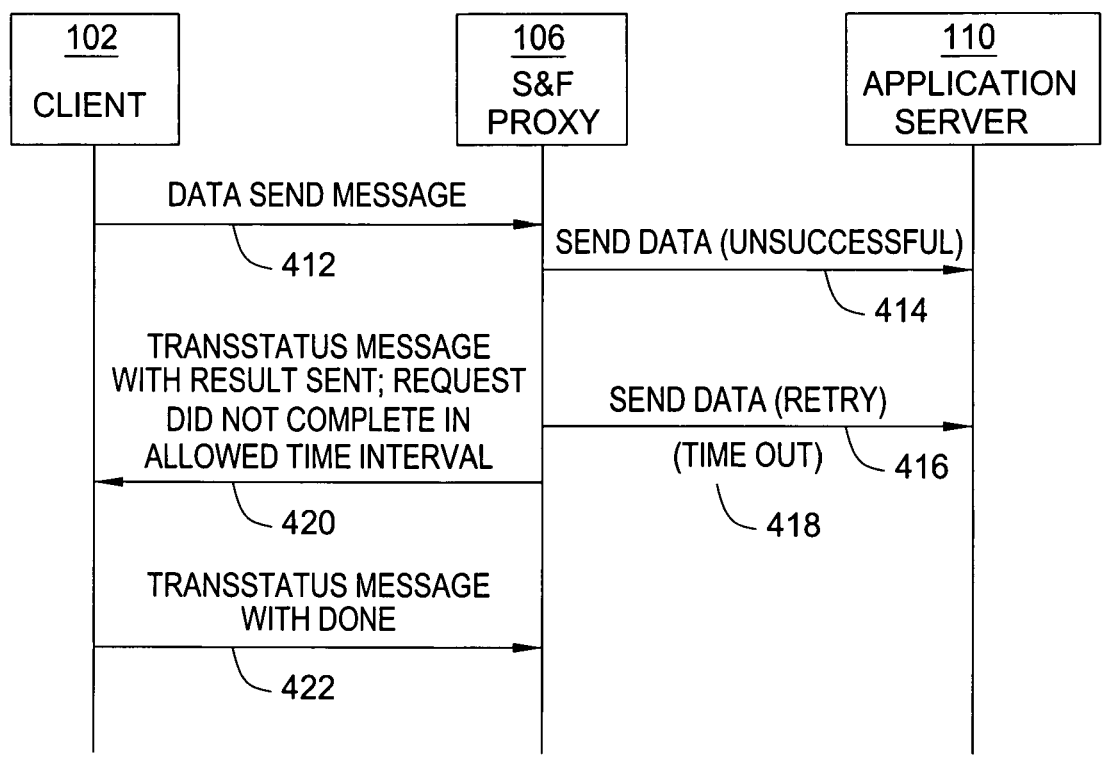
FIG. 4E is a flow diagram showing the messages that are exchanged with the DATA_ACK, SEND_RESULT, and SEND_DONE flags are set when the send is unsuccessful and times out after retrying, in an exemplary embodiment.

FIGS. 4D and 4E show exemplary embodiments 400, 402 for a method that the messages that are exchanged when the DATA_ACK, SEND_RESULT and SEND_DONE flags are set, in this exemplary embodiment. This sequence provides the most reliability, but as a consequence requires the most amount of messages to be exchanged. In FIG. 4D, the data is sent successfully, but in FIG. 4E, the send is unsuccessful and times out after retrying.

In FIG. 4D, at 404, a data send message is sent from the client 102 to the S&F proxy 106. At 406, the data is sent from the S&F proxy 106 to the application server 110. At 408, a transmit status message with data ACK is sent from the S&F proxy 106 to the client 102. At 410, the result is sent from the S&F proxy 106 to the client 102 with the status of the client data send request. At 412, a transmit status message with DONE is sent from the client 102 to the S&F proxy 106.

In FIG. 4E, at 412, a data send message is sent from the client 102 to the S&F proxy 106. At 414, the data is unsuccessfully sent from the S&F proxy 106 to the application server 110. At 416, the S&F proxy 106 retries sending the data and, then, times out at 418. At 420, the transmit status message with result is sent from the S&F proxy 106 to the client 102, because the request did not complete in the allowed time interval. At 422, the client 102 send the transmit status message with done to the S&F proxy 106.

Transport Protocol Details

Common Store And Forward Header

Figure 5:
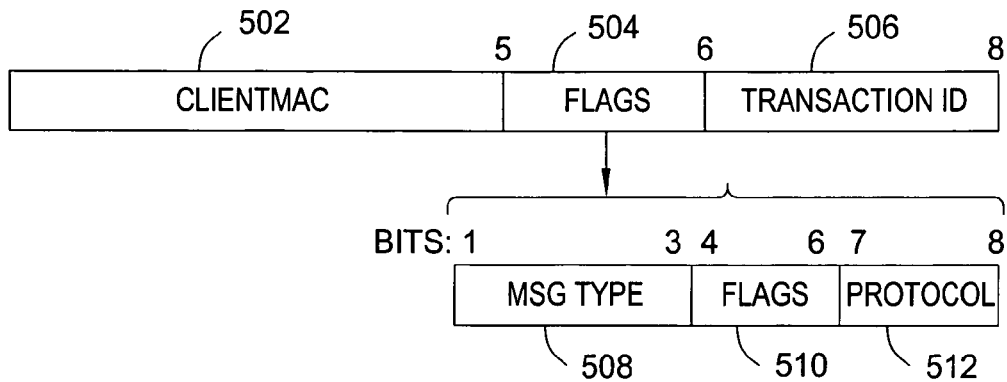
FIG. 5 is a block schematic diagram that shows an exemplary embodiment of a header that is sent at the start of every message, both from the client to the proxy and from the proxy down to the client, according to the invention.

FIG. 5 shows one exemplary embodiment 500 of a header that is sent at the start of every message both from the client 102 to the S&F proxy 106 and from the S&F proxy 106 down to the client 102. In this exemplary embodiment 500, the header includes the following fields: client media access control (MAC) address 502, flags (byte) 504, and transaction ID 506. The client MAC 502 address field is the five-byte identifier for the set top box. The flags field 504 is a one-byte field that consists of three bits for the message type 508, three bits for flags 510, and two bits for the transport protocol 512. The message type field 508 can be one of TRANS_DATA, TRANS_STATUS, or TRANS_CANCEL. The flags 510 can be any OR-ed combination of TRANS_SEND_DATA_ACK, TRANS_SEND_RESULT, and TRANS_SEND_DONE. The protocol field 512 can be one of PROTO_UDP, PROTO_TCP, or PROTO_HTTP. The transaction ID field 506 is a two-byte field that uniquely identifies the transaction from this client.

Data Request Message

Figure 6:
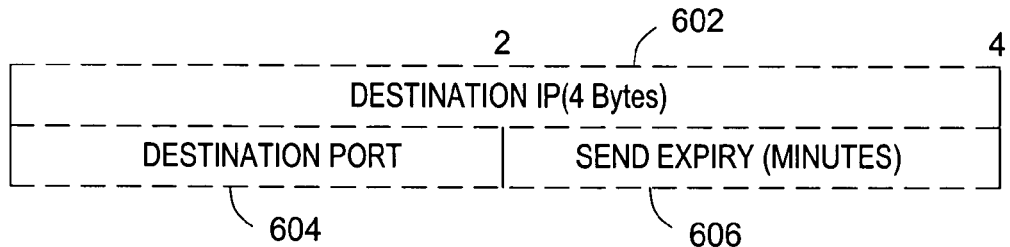
FIG. 6 is a block schematic diagram that shows an exemplary embodiment of a data request message that is included after the common data header, according to the invention.

FIG. 6 shows one exemplary embodiment 600 of a data request message, which is included after the common data header 500 of FIG. 5. In this exemplary embodiment 600, the data request message includes the following fields: destination IP address 602, destination port 604, and send expiry 604. The send expiry field 604 is the number of minutes, relative to the time the S&F proxy 106 receives the data to send to the application server 110. If this time elapses without a completed send to the application server 110, either a success or the application server 110 returned a failure (only for HTTP in one embodiment), then the transaction is considered to have timed out. No further attempts are made to send the data to the application server 110. The S&F proxy 106 then changes transaction expiry to a value within the range of send expiry 604 seconds to a fixed period of time, such as 60 seconds in one embodiment, to send this TIMEDOUT result back to the client 102, if RESULT was requested by the client 102. The destination IP address 602 is the four-byte IPv4 address of the application server 110 to which to send the data. In another embodiment, this could be a host name of the application server, rather than an IP address. The destination port 604 is the two-byte port number on the application server 110 to which to send the data. The protocol to use to send the data is specified in the common header 500.

Transaction Status Message

Figure 7:
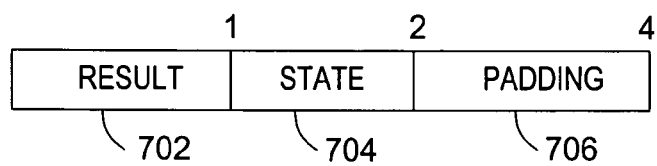
FIG. 7 is a block schematic diagram that shows an exemplary embodiment of a message that is sent by the proxy to the client for the purposes of an acknowledgement and to send the result of the transaction.

FIG. 7 shows one exemplary embodiment 700 of a transaction status message. This exemplary embodiment 700 of the transaction status message includes the following fields: result 702, state 704, and padding 706. This message is sent by the S&F proxy 106 to the client 102 for the purposes of acknowledgement and for sending the result of the transaction. It is sent from the client 102 to the S&F proxy 106 to indicate that the client 102 has finished with the transaction. This is appended after the common data header 500. The result field 702 is the last known result of this request, which is one of the following results: INVALID, INPROGRESS, SUCCEEDED, FAILED, TIMEDOUT, CANCELLED, or TOO_MANY_TRIES. The state field 704 is the current state of the transaction, if the result 702 was INPROGRESS. Otherwise, the state field 704 may be one of the following states: DATA_RCVD, DATA_ACKED, SENDING_DATA, and SENT_DATA.

Figure 8:
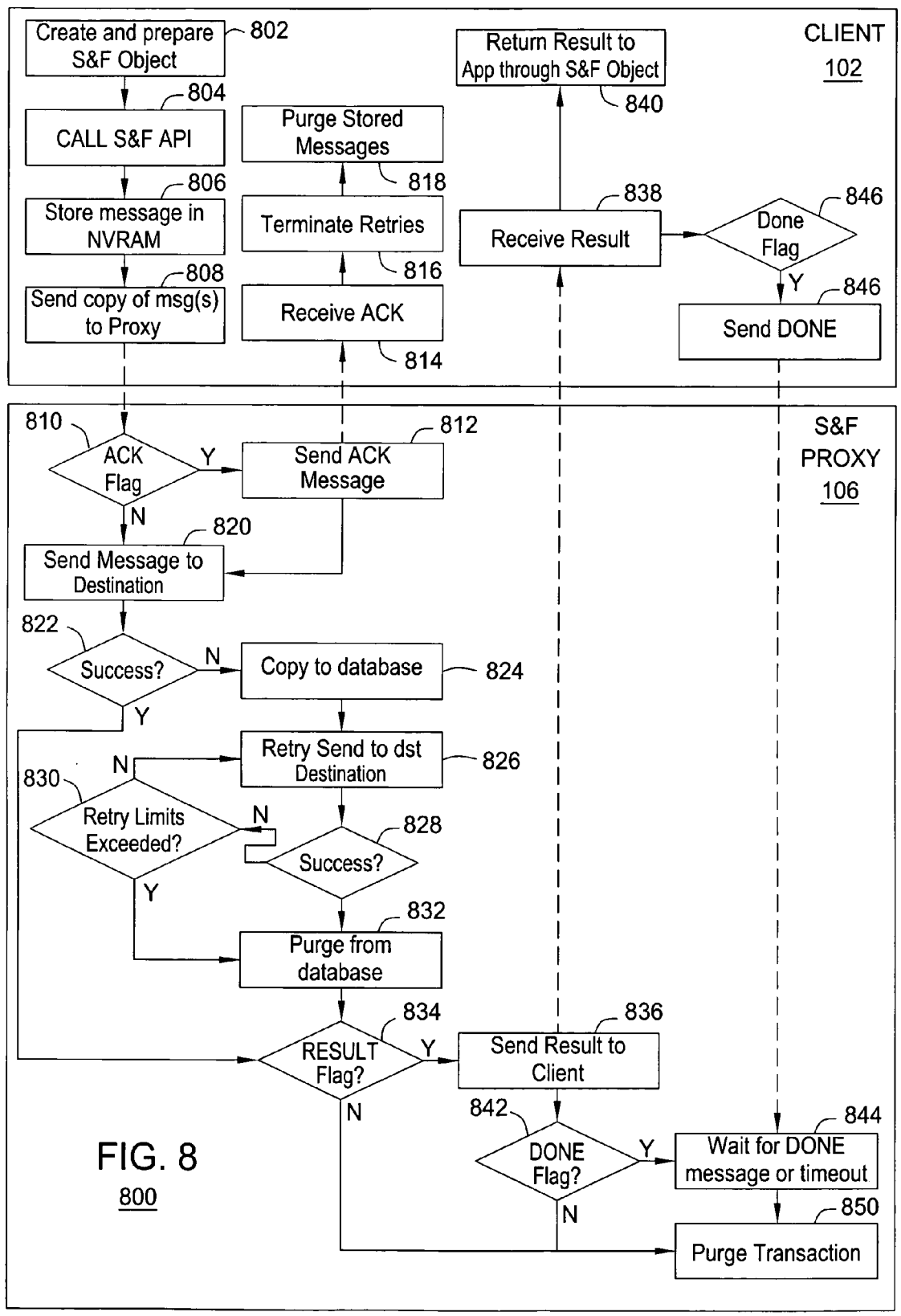
FIG. 8 is a block schematic diagram that shows an exemplary embodiment of a method of implementing a no delayed acknowledgement (ACK) scheme.

FIG. 8 shows an exemplary embodiment 800 of a method of implementing a no delayed acknowledgement (ACK) scheme. (Compare the delayed ACK scheme of FIG. 9.) In this exemplary embodiment 800, messages are exchanged between the client 102 and the S&F proxy 106. At 802, the client 102 creates and prepares an S&F object. At 804, the client 102 calls the S&F API 124. At 806, the client 102 stores a message in NVRAM. At 808, the client 102 sends a copy of the message or messages to the S&F proxy 106.

At 810, the S&F proxy 106 determines whether the ACK flag is set in the message. If the ACK flag is set, at 812 the S&F proxy 106 sends an ACK message to the client 102. If the ACK flag is not set, control flows to 820.

At 814, the client 102 receives the ACK message, terminates retries at 816, and purges stored messages at 818.

At 820, after determining that the ACK flag is not set, the S&F proxy 106 sends the message to the destination (i.e., the application server 110). At 822, the S&F proxy 106 determines whether the message was sent successfully. If the message was not sent successfully at 822, the S&F proxy 106 copies the message to the database 308 at 824 and retries sending the message to the destination at 826. If it is determined at 828 that the retry was not successful, the S&F proxy 106 retries sending the message, until the retry limits are exceeded at 830. If the retry was successful, the message is purged from the database 308 at 832. If the message was sent successfully at 822, or if a retry was successful at 828, the S&F proxy 106 determines whether the RESULT flag is set at 834. If the RESULT flag is set, the S&F proxy 106 sends the result to the client 102 at 836.

At 838, the client 102 receives the result from the S&F proxy 106 and, at 840, returns the result to the client application 120 through the S&F object.

At 842, after sending the result to the client at 836, the S&F proxy 106 determines whether the DONE flag is set. If the DONE flag is set, the S&F proxy 106 waits for a done message or a timeout at 844.

At 846, after receiving the result at 838, the client 102 determines whether the DONE flag is set. If the DONE flag is set, the client 102 sends a done message to the S&F proxy 106 at 848.

At 850, after determining that the DONE flag was not set at 842 or the RESULT flag was not set at 834, the S&F proxy purges the transaction.

Figure 9:
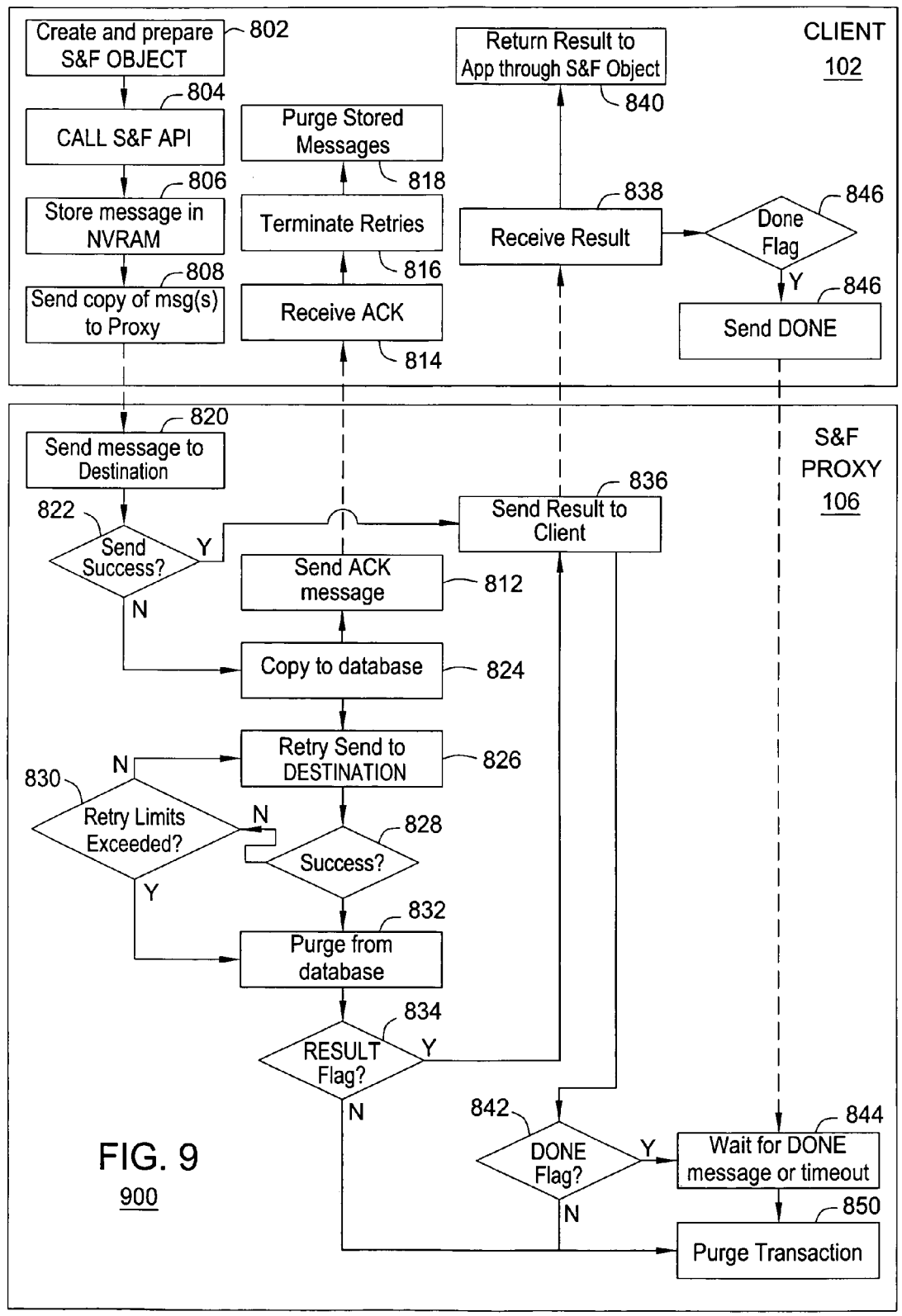
FIG. 9 is a block schematic diagram that shows an exemplary embodiment 900 of a method of implementing a delayed acknowledgement (ACK) scheme.

FIG. 9 shows an exemplary embodiment 900 of a method of implementing a delayed acknowledgement (ACK) scheme. In this exemplary embodiment 800, some of the steps are the same as the no-delay ACK scheme of FIG. 8, but some steps are new, missing, or re-ordered in the delayed ACK scheme of FIG. 9. The steps performed by the client 102 are the same as in the no-delay ACK scheme of FIG. 8. However, in FIG. 9, the S&F proxy 106 does not determine whether the ACK flag is set or send the ACK message if it is. Instead, in FIG. 9, the S&F proxy simply attempts to send the message to the destination at 820, without checking the ACK flag. If the message is sent successfully at 822, the result is sent to the client 102, without checking the RESULT flag at 834. If the message is not sent successfully at 822, it is copied to the database 308 at 824 and the ACK message is sent at 812. This is different from the no delayed ACK scheme of FIG. 8, where the ACK message is sent only if the ACK flag is set.

S&F Proxy Details

The S&F proxy 106 receives data sent from the client 102 and passes it on to the host specified in the data. The client 102 also specifies the transport mechanism to be used, e.g., TCP, UDP or HTTP. If the S&F proxy 106 cannot send the data to the final destination (i.e., the application server 110) within a given period of time (e.g., ten seconds), then the S&F proxy 106 saves the client data to a database 308, and sends an acknowledgement to the client 102 (in some embodiments) to tell the client 102 that the S&F proxy 106 has successfully received the request and is responsible for ensuring its delivery. The S&F server 106 continues to try to deliver the data to the destination application server 110 until a timeout for that request has expired, the client 102 cancels the request, or it has been successfully delivered.

Running The S&F Proxy

One exemplary embodiment of the S&F proxy 106 has the following command-line options: p, c, d, u, and w. The command-line option p specifies the UDP port number that the S&F proxy 1-6 listens on to receive requests from clients 102. In one embodiment, if this option is not specified, a default of 1022 is used and the proxy is run with a EUID of 0. The command-line option c specifies the path to a configuration file. The default is "./.proxyrc". This configuration file specifies the debugging level to use, as well as the name of the debugging output file to use. The configuration file can be changed at run-time and is reread by sending the S&F proxy 106 process a SIGHUP. The command-line option d specifies the data source name (DSN) to use. This name must refer to an entry in the odbc.ini configuration file that the S&F proxy 106 reads. It uses this to determine on which host the database 308 resides and which open database connectivity (ODBC) driver to use to communicate with it. The command-line option u specifies the username the S&F proxy 106 uses when logging into the database. The command-line option w specifies the password, if any, to use with the given username to log in to the database 308.

In this exemplary embodiment, the data the S&F proxy 106 sends to the client 102 (e.g., set top box (STB)) is sent as a UDP packet. This UDP packet is received by the network controller (NC) and sent downstream to the client 102 via the out of band channel (OOB). There is a route or routes for the client IP addresses to the NC, which is the gateway to the operation, administration, management and provisioning (OAM&P) network. OAM&P is the network between the S&F proxy 106 and the network controller in the RF distribution network 104.

APPLICATION SERVER EXAMPLE

In one embodiment, the application server 110 is a statistics server. When contacted by the S&F proxy 106, the application server 110 breaks down the received information into single events and saves them, for example, in a flat text file. In one embodiment, the fetcher 112 is daemon that runs in a central point of the headend (not shown). The fetcher 112 collects data from one or more application servers 110 and saves the collected data to, for example, a central log file. In one embodiment, the data bridge (not shown) is a software utility that can be used to import a flat text file into an Oracle database. The fetcher 112 output files are used by the data bridge to store data in the database. In one embodiment, a third party tool, such as BrioQuery, can be used to create graphical representations of the collected data.

Statistics Gathering & Transmission

One exemplary embodiment is a method of statistics gathering and transmission. As events are triggered by user interaction with the client 102, statistics are gathered in a buffer. At the client level, the fields are shown below in Table A.

TABLE A

| User | Event | Date | Data |
|---|---|---|---|
| APDN | 0010304ead | 996521265 | Menu:0;3 |
| APDN | 0010304ead | 996521427 | /interactive/Golf.jar;328 |
| APDN | 0010304ead | 996521530 | Menu:1;8 |
| APDN | 0010304ead | 996521710 | /interactive/Spades.jar;175 |
| UWWW | 0010304ead | 998936906 | .backslash.http://www.metatv.net/compact_att/cnnsi/story.jsp?want=2;13 |

In this exemplary embodiment, the typical size of the MENU event is approximately 34 bytes. Because of the variable "data" field, a micro browser application (μ Browser) statistic can be as large as a visited URL. The events are approximately 90 bytes in this embodiment. When the client buffer is filled and additional statistics are generated, before the current ones are removed, the oldest statistics are removed to create space. Currently, there is no operator indication when this occurs. When an upstream statistic transmission is triggered, a single, or group of statistics is sent to the S&F proxy 106 in a single upstream packet. The packet payload is limited to a maximum of approximately 1000 bytes in this embodiment. In this exemplary embodiment, a packet is to be sent up to a maximum of ten times between the first transmission and the maximum expiry time, currently twenty four hours. Once an ACK is received from the S&F proxy 106, the client 102 assumes the statistic was successfully sent and removes it from memory. If, after ten attempts to send the statistic, an ACK is not received, the statistic is cleared from memory.

Log File Format—Server

In one embodiment, the log file format includes a single user event per line, with the following four tab delimited fields: date, event, user, and data. In addition, the following log file parameters may be included: server, date, and time. The date and time are measured, for example, in seconds since Jan. 1, 1970, (the UNIX Epoch) that the event reached the server in Greenwich Mean Time (GMT). This allows for the use of standard UNIX function calls for the decoding of time. The event is a four character user event code that describes a single user action. The user is an identification of the user that caused the event. In one embodiment, identification is made only at the set-top level, not at the user level. The data is any optional data associated with an event.

Current User Event Codes

Table B below outlines the event codes used in one embodiment. Each event is accompanied by a time stamp and the set-top/username. Some events also include additional data in the optional data field. For example, the TVCH event contains the numeric value of the channel that was tuned.

TABLE B

Event Codes

| Event Code | Description | When Event is Triggered | Data Field |
|---|---|---|---|
| UNON | Unit On | Set-top is powered on | n/a |
| UNOF | Unit Off | Set-top is powered off | n/a |
| ULIN | User Login | User logs in | n/a |
| ULOF | User Logoff | User logs off | n/a |
| TVCH | New TV | User tunes to a new channel | numeric value of channel, example: 2 |
| TVLC | Left TV Channel | User leaves a tuned channel | numeric value of the channel that was left and the channel that is currently being viewed separated by a semicolon example: 2;7 |
| TVMT | TV Mute On | TV is muted | n/a |
| TVUM | TV Mute Off | Sound is turned back on | n/a |
| WWPG | New Web Page | URL is visited | the URL, example: http://www.cnn.com |

Additional User Event Codes

Table C below outlines the additional codes that are added to the existing set to facilitate user interaction with the Guide, μ Browser, TV Ticker, and Games, in one embodiment. Each event is accompanied by a time stamp and the set-top name. Some events also include additional data in the optional data field. For example, the APDN contains an application identifier.

TABLE C

Additional User Event Codes

| Event Code | Description | When Event is Triggered | Data Field |
|---|---|---|---|
| GDON | Guide On | User enters the Guide | The menu in Guide that is selected. At this time, only the main menu is identified in |

TABLE C-continued

Additional User Event Codes

| Event Code | Description | When Event is Triggered | Data Field |
|---|---|---|---|
| | | | statistics gathering; example: main. |
| GDDN | Guide Duration | User exists a menu from the Guide | The menu identifier and the duration using that menu in seconds; example: main; 16. |
| APDN | Application Duration | User exits the application | The application ID and the duration in the application in seconds example: μBrowser;23 |
| UWWW | Micro Browser URL | User leaves a URL | The URL visited and the duration spent at the URL in seconds example: www.liberate.com;300 |
| TKCV | TVTicker Category View | User cursors to a category to view available stories | The category identifier that the user is viewing and duration example: business;5 |
| TKST | TVTicker Story Selection | User selects a story | The story identifier that the user selected and the duration spent reading story example: Sports;tc.jsp?11751;47 |

Example Event Entries Of Data

Some examples of typical user events are as follows, each has the following form: {timestamp, event code, client address, timestamp, application-specific data field}: (1) 996588616 APDN 0010304ead 996521265 Menu:0;3; (2) 996588616 APDN 0010304ead 996521427/interactive/Golf-jar;328; (3) 996588616 APDN 0010304ead 996521530 Menu:1;8; and (4) 996588616 APDN 0010304ead 996521710/interactive/Spadesjar;175. All events arrived at the Server on Tue Jul 31 10:10:16 2001. These events can be interpreted as: (1) user displayed the menu for 3 seconds and then exited on Jul 30 15:27:45 2001; (2) user played Golf game for 328 seconds and exited on Jul 30 15:30:27 2001; (3) user displayed the menu #1 for 8 seconds and then exited on Jul 30 15:32:10 2001; and (4) user played Spades game for 175 seconds and exited on Jul 30 15:35:10 2001.

Client Configuration

One exemplary embodiment is a method for client-side provisioning for statistics gathering, which is facilitated through a configuration file. For example, a config.props file is uploaded using a carousel user interface utility to a /etc directory of an out of band file carousel, which is being transmitted to the clients 102. The carousel user interface is a way to put a configuration file or other information onto a carousel server, which is at the headend and sends carouselled data files continuously to clients, e.g., set top boxes. The configuration file may include information such as configuration for the S&F system, the number of messages to store, how frequently to send them, and the like.

One exemplary embodiment is a method for configuring the following variables: SFProxyAddress, SFProxyPort, SFSchedDelay, SFMaxConcMsgs, SFMaxMemSize, SFBlackoutSchedule, StatsAnonymous, StatsMaxBufferSize, StatsBufferSize, StatsFlushTime, and Address, Port.

In this exemplary embodiment, SFProxyAddress defines the IP address of the S&F proxy 106 and must be in the dotted-decimal format and cannot be a hostname. Also, the IP address must be one that is connected to the IP network 108. There is no default value. Therefore, if it is not provided, messages are not sent from the client 102 to the S&F proxy 106. For example, this exemplary embodiment may set SFProxyAddress=192.168.14.215.

In this exemplary embodiment, SFProxyPort defines the port on which the S&F proxy 106 server is providing the S&F service. For example, this exemplary embodiment may set a default value of 1022 or SFProxyPort=10010.

In this exemplary embodiment, SFSchedDelay is used in calculating the time at which an upstream message is sent. An upstream message is sent at a random time between blackout periods. The SFSchedDelay determines the window of time within which a random value is chosen. The unit of measure for SFSchedDelay is seconds.

In this exemplary embodiment, SFMaxConcMsgs defines the maximum number of S&F messages held in memory. A value of zero is valid, but pending messages are not purged. An exemplary default value is 100.

In this exemplary embodiment, a recommended setting for SFMaxMemSize is 8192, which is the maximum amount of memory that the S&F system can use when storing messages. The unit of measure is bytes. An exemplary default value is 8192.

In this exemplary embodiment, a recommended setting for SFBlackoutScheduleis 6 AM-12 PM Daily. This defines the a times when the client 102 is not allowed to send upstream messages to the S&F proxy 106 and includes a list of start-time end-time combinations separated by commas, e.g., SFBlackoutSchedule=M 12:30 T 13:30, W 14:00 W 18:00. The schedule spans for a week. The start-times for a blackout period must be smaller than the end-time. The days of the week are abbreviated by one letter and are ordered as follows: S (Sunday)<M (Monday)<T (Tuesday)<W (Wednesday)<H (Thursday)<F (Friday)<A (Saturday). The time is specified on a 24 hour clock starting at time 0 and ending and hour 23. The separators are space (' ') and comma (','). Currently, the accepted blackout period for field deployments is 6 PM to 12 AM daily:

SFBlackoutSchedule=M 18:00 T 0:00, T 18:00 W 0:00, W 18:OOH 0:00, H 18:00 F 0.backslash.:00, F 18:00 A 0:00, A 18:00 S 0:00, S 18:00 M 0:00.

In this exemplary embodiment, StatsAnonymous specifies whether or not the statistics gathered are anonymous. In other words, if it is anonymous, then the user names are marked with an 'X' when they are recorded. A value of "false" results in user names being recorded. The default is to be anonymous. An exemplary value is StatsAnonymous=false.

In this exemplary embodiment, the recommended setting for StatsMaxBufferSize is 8192. This specifies the amount of S&F memory that can be used for statistics. Once the limit is reached and a new statistic is recorded, pending statistics are cancelled, starting with the oldest. The unit of measure is bytes and default value is 8192.

In this exemplary embodiment, the recommended setting for StatsBufferSize is 880. This specifies the amount of statistics data that is buffered before it is sent to the application server 110. The values supported are in the range 15-880. The unit of measure is bytes.

In this exemplary embodiment, the recommended setting for StatsFlushTime is 1800. This specifies the amount of time statistics are buffered before they are flushed. The value must be greater than zero and the unit of measure is seconds.

In this exemplary embodiment, the Address variable specifies the address of the application server 110 and must be in the dotted-decimal format. It cannot be a hostname. There is no default value. Therefore, if it is not provided, statistics are not sent from the client to the proxy. An exemplary value is Address=192.168.14.206.

In this exemplary embodiment, Port defines the port on which the application server 110 servicing requests and the default value is 89.

In this exemplary embodiment, to disable the gathering and transmission of stats, set the following variables to 0: SFMaxMemSize and StatsMaxBufferSize.

Statistics Gathering

One exemplary embodiment is a method of formatting, collecting, and providing a presentation of statistics that are gathered from user interaction. Some areas in which statistics are gathered include: NavShell use, web browsing, TV viewing, TVTicker, µ Browser, ETV, and Games. In this exemplary embodiment, the default configuration sets the user identification field to anonymous. There is, however, a configuration option that allows the client 102 (e.g., the set-top box) to include the actual user name. The duration and exit time of all applications, including games and enhanced TV (ETV) are collected. The duration and exit time of menus displayed by the NavShell menu display. The duration and exit time of ETV icon display events are collected. The manual selection of a category view that lasts for at least five seconds for TVTicker is collected. The category selected to view a complete story and the length of time that a story is viewed is collected. For µ Browser, the URL and the duration at the URL is collected.

One exemplary embodiment is an S&F system 100 that supports multiple applications within an extensible network 108 to direct information of various formats to any of multiple destinations, including a client application 120 resident at a client 102 location for storing non-priority data and for sending said data to any one or more application servers 110 on the network 108 at some future time and a server-side proxy server process 106. In one embodiment of the S&F system 100, the client application 120 allows any of sending usage statistics to a database 308 on the network 108 and enabling T-commerce purchases to be made by a user, where purchase and other relevant information is sent to a destination server 110.

Another exemplary embodiment is an S&F system 100 that includes a client module 116, an S&F proxy 106, and a server 110. The client module 116 resides on a digital terminal 102 for facilitating the gathering of user events from different applications, and for sending the user events to a store and forward proxy 106 in a message batch. The S&F proxy 106 includes a server-side construct for facilitating upstream communication for the digital terminal 102. The S&F proxy 106 converts user event data received by the S&F proxy 106 to a standardized format and sends the converted data to a server 110. The server 110 facilitates communications from both the client 102 and a fetcher 112. The server 110 breaks down received information into single events and saves them in a file 114 when contacted by the S&F proxy 106. The fetcher 112 collects data from at least one server 110 and saves the data to a central log file 114.

In one embodiment, the system also includes a data bridge for importing the fetcher central log file 114 into a database 308.

In one embodiment, the client module 116 includes a configuration file.

In one embodiment, the configuration file includes any of the following variables: SFProxyAddress, SFProxyPort, SFschedDelay, SFMaxConcMsgs, SFMaxMemSize, SFBlackoutSchedule, StatsAnonymous, StatsMaxBufferSize, StatsBufferSize, StatsFlushTime, address, and port. SFProxyAddress defines an IP address of the S&F proxy 106. SFProxyPort defines a port on which the S&F proxy 106 provides store and forward service. SFschedDelay is used in calculating a time at which an up stream message is sent. An upstream message is sent at a random time between blackout periods and SFSchedDelay determines a window of time within which a random value is chosen. SFMaxConcMsgs defines a maximum number of store and forward messages held in memory. SFMaxMemSize is a maximum amount of memory that the S&F system 100 can use when storing messages. SFBlackoutSchedule defines a time when the client module 116 is not allowed to send upstream messages to the S&F proxy 106 and includes a list of start-time and end-time combinations. StatsAnonymous specifies whether or not statistics gathered are anonymous. StatsMaxBufferSize specifies an amount of store and forward memory that can be used for statistics. Once a limit is reached and a new statistic is recorded, pending statistics are cancelled, starting with an oldest. StatsBufferSize specifies an amount of statistics data that is buffered before it is sent to a statistics server. StatsFlushTime specifies an amount of time statistics are buffered before they are flushed. Address specifies an address of a statistics server. Port defines a port on which a server is servicing requests.

In one embodiment of the system 100, the S&F proxy 106 facilitates communication between the client module 116 and the application server 110 as follows. The client module 116 sends data to the S&F proxy 106. The S&F proxy 106 then transfers the data from to the application server 110 from memory. The S&F proxy 106 then sends a result message to the client module 116 to inform it that the data was sent to the application server 110 so that the client module 116 may purge at least a majority of a transaction from client memory. In the event that initial data does not reach the S&&F proxy 106 or the S&F proxy 106 goes down between a time the data are received and the data are sent to the application server 110, a result message is not sent and the client module 116 assumes that the data did not reach the S&F proxy 106, thereby causing a retransmit of the data.

In one embodiment of the S&F system 100, the S&F proxy 106 facilitates communication between the client module 116 and the application server 110 when the application server 110 cannot be contacted within a prescribed period of time as follows. The client module 116 sends data to the S&F proxy

106. The S&F proxy 106 then attempts to transfer the data to the application server 110 from memory. After a predetermined interval, the S&F proxy 106 assumes the application server 110 is down and writes a transaction to a database 308. The S&F proxy 106 then sends a result message to the client module 116 to inform it that data was written to the database 308, so that the client module 116 knows a packet was received and does not require a retransmit. The S&F proxy 106 sends the data to the application server 110 at a later date and the S&F proxy 106 then sends a result message to the client module 116 so that the client module 116 may purge at least a majority of a transaction from client memory.

In one embodiment of the S&F system 100, the client module 116 further includes a buffer for gathering statistics as events are triggered by user interaction. In one embodiment, the client module buffer is filled and additional statistics are generated. Before current statistics are removed, the oldest statistics are removed to create space. In one embodiment, when an upstream statistic transmission is triggered, a single, or group of statistics is sent to the S&F proxy 106 in a single upstream packet. In one embodiment, once an acknowledgement is received from the S&F proxy 106, the client module 116 assumes a statistic was successfully sent and removes it from memory.

Another embodiment is a method for performing a store and forward transaction. At a client 102, an applet is used to create an instance of a StoreAndForward object. The required data is filled in and a send method is invoked. A request is stored in non-volatile memory to guard against power outages. At some point in time, a copy of the request is sent to an S&F proxy 106, while keeping an original in non-volatile memory. At the S&F proxy 106, the message is received from the client 102 and a copy is stored in a database 308 to prevent data loss. An acknowledgement is sent back to the client 102 telling the client 102 that it has successfully received the data. The S&F proxy 106 attempts to deliver the data to an application server 110 that is specified in the data. The client receives the acknowledgement and then removes a payload part of a transaction from non-volatile memory, because the S&F proxy 106 has the payload. The client 102 keeps some information about the transaction in non-volatile memory, until the transaction is completed. The S&F proxy 106 attempts to contact the application server 110 at an address and port given in the request data via a protocol that the client 102 requested. The S&F proxy 106 continues to try to send the data up to a number of request attempts given in the request or until a time limit to send the data is expired. The S&F proxy 106 creates a transaction status message with the final result and stores this message in the database 308. The S&F proxy 106 sends the message back to the client 102 and waits for a done message from the client 102. When the client 102 receives the transaction result, the client 102 can notify an original applet, if the applet is still running. The client 102 sends a transaction status message to the S&F proxy 106 indicating that said transaction is done. When the S&F proxy 106 receives the done status message from the client 102, the S&F proxy 106 purges all records of the transaction from the database 308.

Another embodiment is an S&F system 100 that includes a client application 120, a server-side proxy server process, a store and forward protocol header, and means for setting at least one flag. The client application 120 is resident at a client 102 location for storing data and for sending the data to any one or more servers 110 on a network 108 at some future time. A store and forward header is sent at the start of every message both from the client 102 to the S&F proxy 106 and from the S&F proxy 106 down to the client 102.

In one embodiment, the at least one flag is any of the following flags: SEND_DATA_ACK, SEND_RESULT, and SEND_DONE. The SEND_DATA_ACK flag indicates that the client 102 wants the S&F proxy 106 to send an acknowledgement that the S&F proxy 106 received the client's 102 request successfully and the client 102 keeps retransmitting the request, until an acknowledgement is received. The SEND_RESULT flag indicates that the client 102 wants to have a result of a transaction sent back to it when the transaction has either completed successfully, failed, or a lifetime has expired before the transaction could be completed. The SEND_DONE flag indicates that the client 102 sends a TRANSACTION_DONE message to the S&F proxy 106 after it receives a transaction result. Setting this flag allows the S&F proxy 106 to know when the client 102 is done with the transaction so that it can purge all data associated with the transaction.

In one embodiment, the store and forward header includes any of the following fields: a client MAC address and one or more flags. The client MAC address is an identifier for a client appliance. The Flags indicate any of the following: a message type, a flag, and a transport protocol, a transaction ID, and a data request message. The transaction ID uniquely identifies a transaction from a particular client.

In one embodiment, the data request message is included after a common data header and includes any of the following: a transaction expiry, a send expiry, a destination address, a destination port number, a number of retransmits, and one or more optional flags. The transaction expiry set a time by which a transaction must complete. The send expiry sets a time the S&F proxy 106 has to send data to an application server 110. The destination address is the address of an application server to which to send the data. The destination port number is the port on an application server to which to send the data. The number of retransmits sets a maximum number of times the S&F proxy 106 attempts to send the data to an application server. The optional flags are set by the client 102 and can specify additional options for a request.

In one embodiment, the S&F system 100 also includes a transaction status message appended after a common data header. The transaction status message is sent by the S&F proxy 106 to the client 102 as an acknowledgement and to send a result of a transaction. The transaction status message is sent from the client 102 to the S&F proxy 106 to indicate that the client has finished with a transaction. The transaction status message includes any of the following: a result and a state. The result is a last known result of a request and can include any of the following results: INVALID, INPROGRESS, SUCCEEDED, FAILED, TIMEDOUT, CANCELLED, or TOO_MANY_TRIES. If a result is INPROGRESS, then the state is a current state of a transaction, and can include any of the following: DATA_RCVD, DATA_ACKED, SENDING_DATA, and SENT_DATA.

Another embodiment is a store and forward system 100 that allows for varying levels of reliability. This system includes a client 102 an S&F proxy 106 and a plurality of messages passed from the client 102 to the S&F proxy 106 and from the S&F proxy 106 to the client 102. The client 102 can specify a level of messaging required by setting flags in each request message to the S&F proxy 106. The flags can be set individually or in combination.

In one embodiment, a flag tells the S&F proxy 106 whether or not to send the client 102 an acknowledgement, when the S&F proxy 106 has received a client's 102 request. The flag lets the client 102 know that it is safe to purge a request data from memory.

In one embodiment, a flag tells the S&F proxy 106 whether or not the client 102 wants to be informed of a result of a request. Low-priority requests may not require a result to be sent back to the client 102.

In one embodiment, a flag tells the S&F proxy 106 whether or not to hold a result of a request, until the client 102 sends the S&F proxy 106 a message acknowledging receipt of the request result. The S&F proxy 106 holds onto a request and a result, until the client 102 indicates that it has successfully received the result.

Although the invention is described herein with reference to exemplary embodiments, one skilled in the art will readily appreciate that other applications may be substituted for those set forth herein without departing from the spirit and scope of the present invention. Accordingly, the invention should only be limited by the claims included below.

The invention claimed is:

1. A method for operating a store and forward (S&F) system for transmitting messages from a client to a recipient in a network, comprising:
   receiving, at an S&F proxy intermediate the client and the recipient, a data message from the client, the data message having a header;
   determining, at the S&F proxy, whether an acknowledgement (ACK) flag is set in the header of the data message, the ACK flag signaling the S&F proxy to send an ACK message acknowledging the S&F proxy's receipt of the data message from the client and informing the client that the data message may be purged from memory;
   if the ACK flag is set in the header:
      waiting, by the S&F proxy until completion or timeout of an S&F transaction before sending the ACK message,
      upon completion of the S&F transaction within a predetermined time, sending a result (RES) message from the S&F proxy to the client instead of the ACK message, the RES message disclosing a result of the S&F transaction;
      upon not completing the S&F transaction within the predetermined time, sending the ACK message from the S&F proxy to the client and storing the data message in a memory at the S&F proxy; and
   if a RES flag is set in the header of the data message;
      upon completion of the S&F transaction or timeout sending the RES message from the S&F proxy to the client.

2. The method of claim 1, further comprising:
   upon receiving a duplicate data message from the client and if the ACK flag is set, sending the ACK message from the S&F proxy to the client.

3. The method of claim 1, further comprising:
   the client creating an S&F object for an S&F application programming interface (API); and
   sending the data message via the S&F API from the client to the S&F proxy.

4. The method of claim 3, further comprising:
   storing the data message in memory at the S&F proxy.

5. The method of claim 1, wherein completion of the S&F transaction includes sending the data message to a server and further comprising
   upon unsuccessfully sending the data message, attempting to send the data message to the server again by the S&F proxy and storing the data message to a database.

6. The method of claim 5, further comprising:
   upon successfully sending the data message, purging the data message from the database by the S&F proxy.

7. The method of claim 1, further comprising:
   waiting, by the S&F proxy, until a done message is received from the client to purge the S&F transaction, if a DONE flag in the header is set.

8. The method of claim 7, further comprising:
   sending a done message by the client to the S&F proxy, responsive to the client receiving the result message, if the DONE flag in the header is set.

9. A store and forward (S&F) system, comprising:
   a client device having a memory and configured to send a data message via a network, the data message including a header, the header including an acknowledgement (ACK) flag and a result (RES) flag; and
   an S&F proxy device, intermediate the client device and a recipient, the S&F proxy device having a memory and configured
      (1) to receive the data message from the client device,
      (2) to wait before sending an ACK message to the client device, until completion of the S&F transaction or timeout, if an ACK flag is set, the ACK message acknowledging the S&F proxy's receipt of the data message from the client device and informing the client device that the data message may be purged from memory,
      (3) to send a RES message to the client device instead of the ACK message, upon completion of the S&F transaction within a predetermined time, if the ACK flag is set, the RES message disclosing a result of the S&F transaction,
      (4) to send the ACK message to the client device and to store the data message, upon not completing the S&F transaction within a predetermined time, if the ACK flag is set, and
      (5) to send the RES message to the client device, upon completion of the S&F transaction or timeout, if the RES flag is set.

10. The S&F system of claim 9, further comprising:
    an Internet Protocol (IP) network to receive IP messages from the S&F proxy; and
    an application server to receive data from the S&F proxy via the IP network.

11. The S&F system of claim 9, wherein the client device further comprises:
    a client software component; and an operating system.

12. The S&F system of claim 11, wherein the client software component further comprises:
    a client application;
    a statistics application programming interface (API) to provide services to the client application; and
    an S&F API to send messages to an application server.

13. The system of claim 12, wherein the client device creates an S&F object for the S&F API and sends the data message to the S&F proxy by calling the S&F API.

14. The system of claim 9, wherein, upon receiving a duplicate data message from the client and if the ACK flag is set, the S&F proxy sends the ACK message to the client device.

15. The system of claim 9, wherein completion of the S&F transaction includes sending the data message to a server and, wherein, upon unsuccessfully sending the data message, the S&F proxy attempts to send the data message to the server again and stores the data message to a database.

16. The system of claim 15, wherein upon successfully sending the data message, the S&F proxy purges the data message from the database.

17. The system of claim 9, wherein the S&F proxy waits to purge the S&F transaction until a done message is received from the client device, if a DONE flag in the header is set.

18. The system of claim 17, wherein the client device sends a done message to the S&F proxy responsive to the client device receiving the result message, if the DONE flag in the header is set.

19. A computer readable medium storing instructions for performing a method for operating a store and forward system for messages from a client to a recipient in a network, the method comprising:

receiving, at an S&F proxy intermediate the client and the recipient, a data message from the client, the data message having a header;

determining, at the S&F proxy, whether an acknowledgement (ACK) flag is set in the header of the data message, the ACK flag signaling the S&F proxy to send an ACK message acknowledging the S&F proxy's receipt of the data message from the client and informing the client that the data message may be purged from memory;

if the ACK flag is set in the header:

waiting, by the S&F proxy, until completion or timeout of an S&F transaction before sending the ACK message, upon completion of the S&F transaction within a predetermined time sending a result (RES) message from the S&F proxy to the client instead of the ACK message, the RES message disclosing a result of the S&F transaction;

upon not completing the S&F transaction within the predetermined time, sending the ACK message from the S&F proxy to the client and storing the data message; and if a RES flag is set in the header of the data message:

upon completion of the S&F transaction or timeout, sending the result message from the S&F proxy to the client.

20. The computer readable medium of claim 19, further comprising:

upon receiving a duplicate data message from the client and if the ACK flag is set, sending the ACK message from the S&F proxy to the client.

21. A store and forward (S&F) proxy comprising a memory and configured to execute a process including:

receiving a data message over a network from a client device, the data message including an acknowledgement (ACK) flag and a results (RES) flag;

transmitting a message to a recipient requesting performance of a transaction based on the data message;

upon determining that the data message received from the client device includes an acknowledgement (ACK) flag that is set, waiting until either completion of the transaction with the recipient or a timeout condition before sending an ACK message;

determining whether a result (RES) flag in the data message has been set;

upon determining that the RES flag has been set and the transaction has been completed within a predetermined time period, transmitting a result message disclosing a result of the transaction to the client device; and upon determining that the RES flag has been set and the transaction could not be completed within the timeout period, transmitting an ACK message to the client device, wherein the ACK message informs the client device that the data message may be purged from memory; and wherein the S&F proxy is configured to be intermediate the client device and the recipient.

\* \* \* \* \*